United States Patent
Ho et al.

(10) Patent No.: US 8,441,170 B2
(45) Date of Patent: May 14, 2013

(54) STATOR AND ULTRASONIC MOTOR USING THE SAME

(75) Inventors: Shine-Tzong Ho, Kaohsiung (TW); Fu-Jie Hu, Tainan (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 119 days.

(21) Appl. No.: 13/091,399

(22) Filed: Apr. 21, 2011

(65) Prior Publication Data

US 2012/0267983 A1     Oct. 25, 2012

(51) Int. Cl.
    *H01L 41/08*     (2006.01)
(52) U.S. Cl.
    USPC .............. 310/323.02; 310/323.12; 310/323.16
(58) Field of Classification Search ............. 310/323.02, 310/328
See application file for complete search history.

(56) References Cited

U.S. PATENT DOCUMENTS

| | | | | |
|---|---|---|---|---|
| 3,558,936 A | * | 1/1971 | Horan ...................... | 310/323.01 |
| 4,706,230 A | * | 11/1987 | Inoue et al. ................... | 367/174 |
| 5,233,258 A | * | 8/1993 | Myoga et al. ............ | 310/323.17 |
| 5,532,540 A | * | 7/1996 | Claeyssen et al. ........ | 310/323.16 |
| 6,147,436 A | * | 11/2000 | Claeyssen et al. ........ | 310/323.02 |
| 2010/0038995 A1 | * | 2/2010 | Claeyssen et al. ........ | 310/323.02 |

* cited by examiner

*Primary Examiner* — Mark Budd
(74) *Attorney, Agent, or Firm* — Alston & Bird LLP

(57) ABSTRACT

An ultrasonic motor includes a stator. The stator includes a seat and a driving unit. The driving unit includes a generally semi-elliptical driving mechanism formed integrally with the seat, and two spaced-apart piezoelectric actuators disposed between the seat and the driving mechanism. Each of the piezoelectric actuators has a first end abutting against the driving mechanism, and a second end opposite to the first end and abutting against the seat.

9 Claims, 12 Drawing Sheets

STATOR AND ULTRASONIC MOTOR USING THE SAME

BACKGROUND OF THE INVENTION

1. Field of the Invention

This invention relates to a stator, and more particularly to a stator used in an ultrasonic motor.

2. Description of the Related Art

Referring to FIGS. 1 and 2, Taiwanese utility model patent No. M286995 discloses an ultrasonic motor that includes a motor base 11, an elliptical stator 12, a support prepressing mechanism 13, and a target object 14. The elliptical stator 12 includes an elliptical elastic body 121, two piezoelectric actuators 122 disposed inside the elliptical elastic body 121, and a mounting post 123 disposed between the piezoelectric actuators 122. Upon application of driving voltages, the piezoelectric actuators 122 are extended and contracted to allow for vibration of a driving protrusion of the elliptical body 121 in an elliptical motion to drive movement of the target object 14.

The aforesaid ultrasonic motor suffers from the following disadvantages:

1. Low strength: The elliptical elastic body 121 of the stator 12 is connected to a supporting seat 131 of the support prepressing mechanism 13 by the mounting post 123. As such, the elliptical elastic body 121 is spaced apart from the supporting seat 131, thereby resulting in a reduction in the strength of the elliptical elastic body 121. Consequently, the elliptical elastic body 121 is easily deformed, so that the target object 14 cannot be driven accurately.

2. Complex structure: The elastic body 121 is mounted to the bottom base 11 by the supporting seat 131. Such a complex structure results in an increase in the manufacturing costs of the ultrasonic motor.

3. Poor precision: Since the ultrasonic motor has a complex structure, errors occur easily during assembly of the ultrasonic motor. That is, the precision of the ultrasonic motor is reduced. Moreover, since the elastic body 121 has a low strength, the precision of the ultrasonic motor is further reduced.

SUMMARY OF THE INVENTION

An object of this invention is to provide a stator for an ultrasonic motor, which has a high strength and a simple structure.

Another object of this invention is to provide an ultrasonic motor that is high in strength and precision and that is simple in structure.

According to an aspect of this invention, there is provided a stator adapted to be used in an ultrasonic motor, the stator comprising:

a seat; and a driving unit including a generally semi-elliptical driving mechanism formed integrally with the seat, and two spaced-apart piezoelectric actuators disposed between the seat and the driving mechanism, each of the piezoelectric actuators having a first end abutting against the driving mechanism, and a second end opposite to the first end and abutting against the seat.

According to another aspect of this invention, there is provided an ultrasonic motor comprising:

a base;

a movable member disposed movably on the base;

at least one stator including a seat disposed removably on the base, and a driving unit including a generally semi-elliptical driving mechanism formed integrally with the seat, and two spaced-apart piezoelectric actuators disposed between the seat and the driving mechanism, each of the piezoelectric actuators having a first end abutting against the driving mechanism, and a second end opposite to the first end and abutting against the seat; and a pushing unit for biasing the driving mechanism to press against the movable member;

wherein, when a driving voltage is applied to at least one of the piezoelectric actuators to deform the driving mechanism, the movable member is driven by the driving mechanism to move relative to the seat.

Since the generally semi-elliptical driving mechanism is formed integrally with the seat to constitute a unitary structure, the strength of the driving mechanism is increased to avoid deformation resulting from application of an external force, and the structure of the stator is simplified to reduce the assembly complexity, errors, and costs to thereby enhance accuracy of the driving mechanism in moving the movable member.

BRIEF DESCRIPTION OF THE DRAWINGS

These and other features and advantages of this invention will become apparent in the following detailed description of three preferred embodiments of this invention, with reference to the accompanying drawings, in which.

DETAILED DESCRIPTION OF THE PREFERRED EMBODIMENTS

Figure 1:
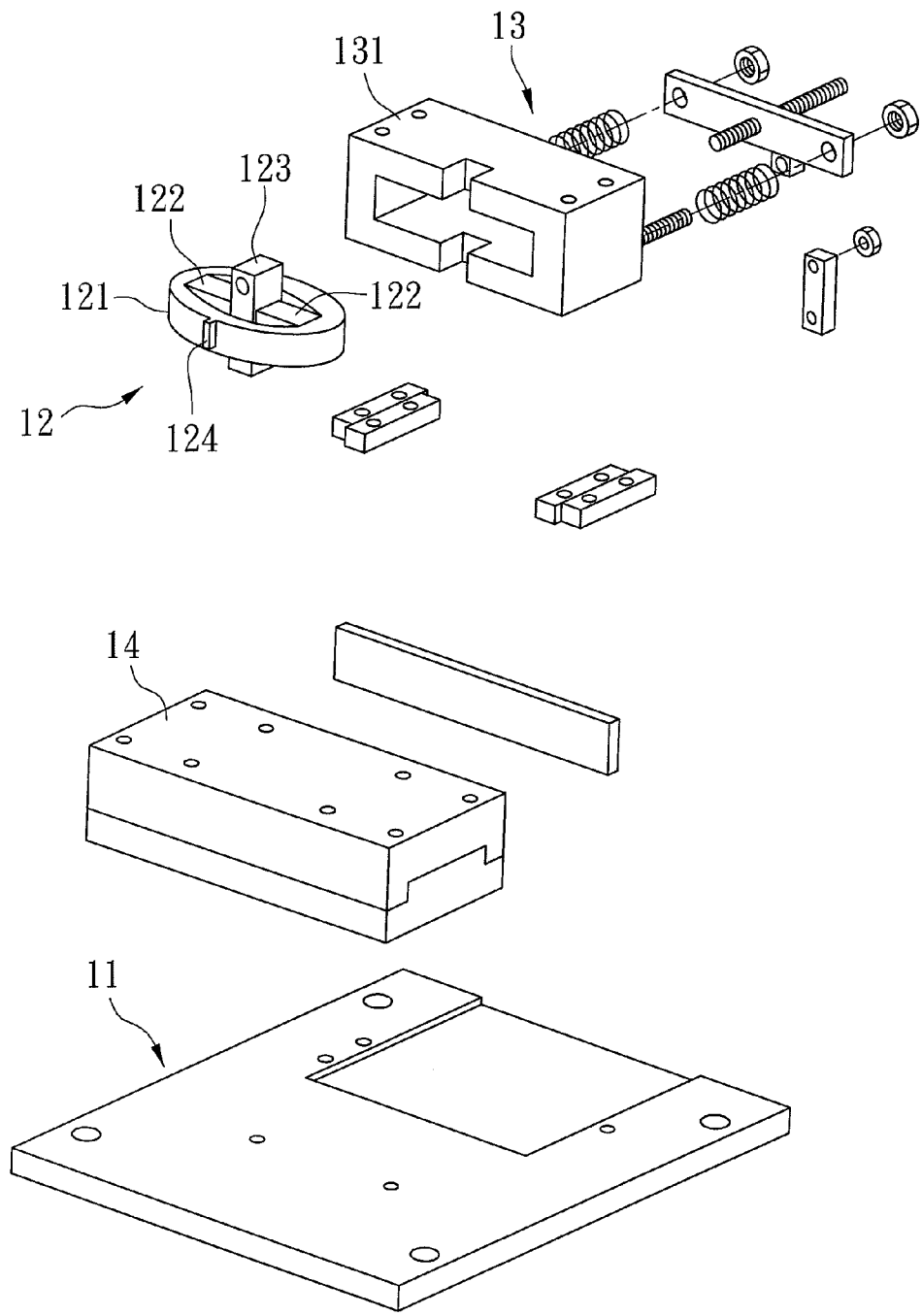
FIG. 1 is an exploded perspective view of a conventional ultrasonic motor disclosed in Taiwanese utility model patent No. M286995.
Figure 2:
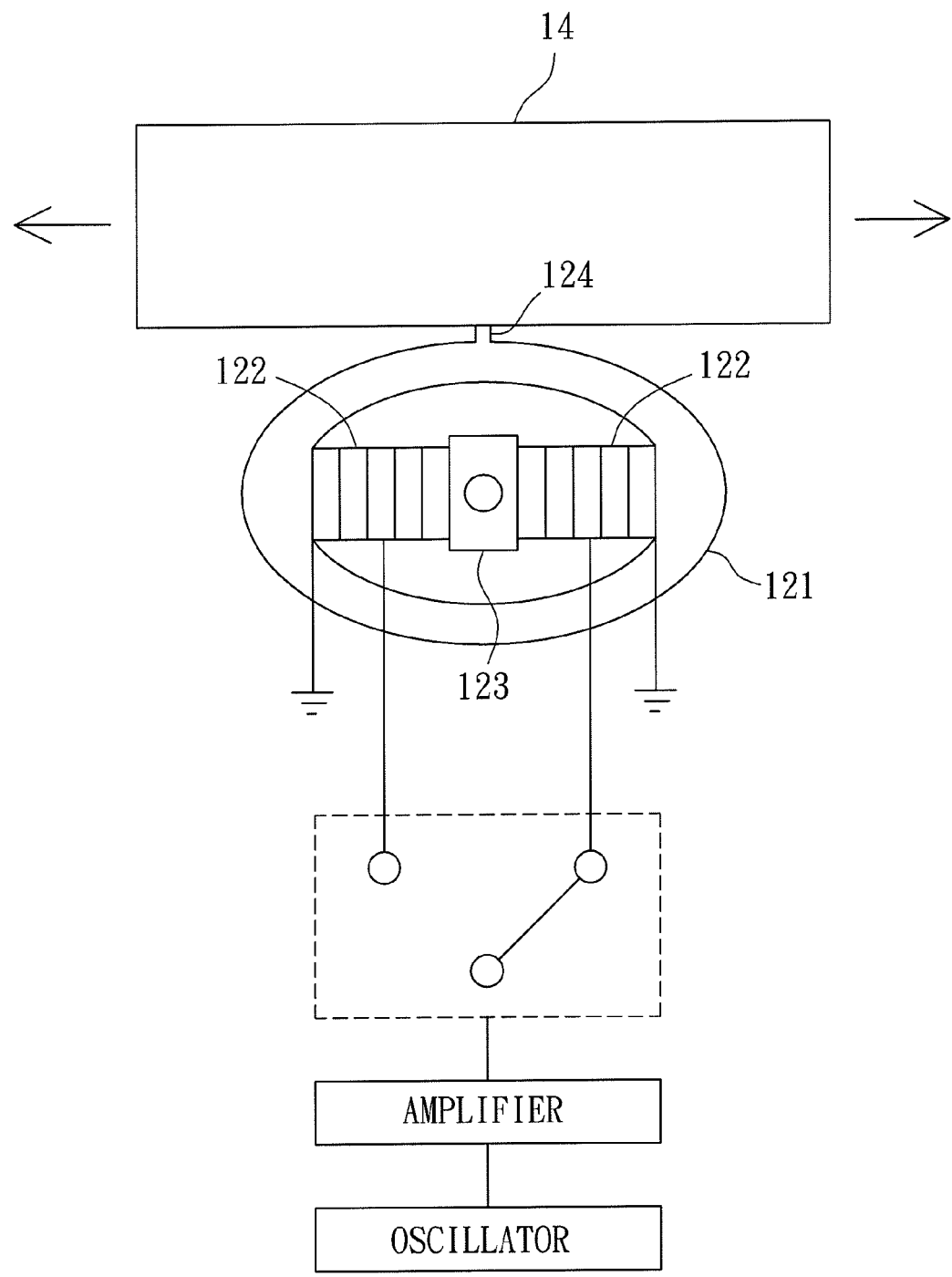
FIG. 2 is a schematic view of the conventional ultrasonic motor.

Before the present invention is described in greater detail in connection with the preferred embodiments, it should be noted that similar elements and structures are designated by like reference numerals throughout the entire disclosure.

Figure 3:
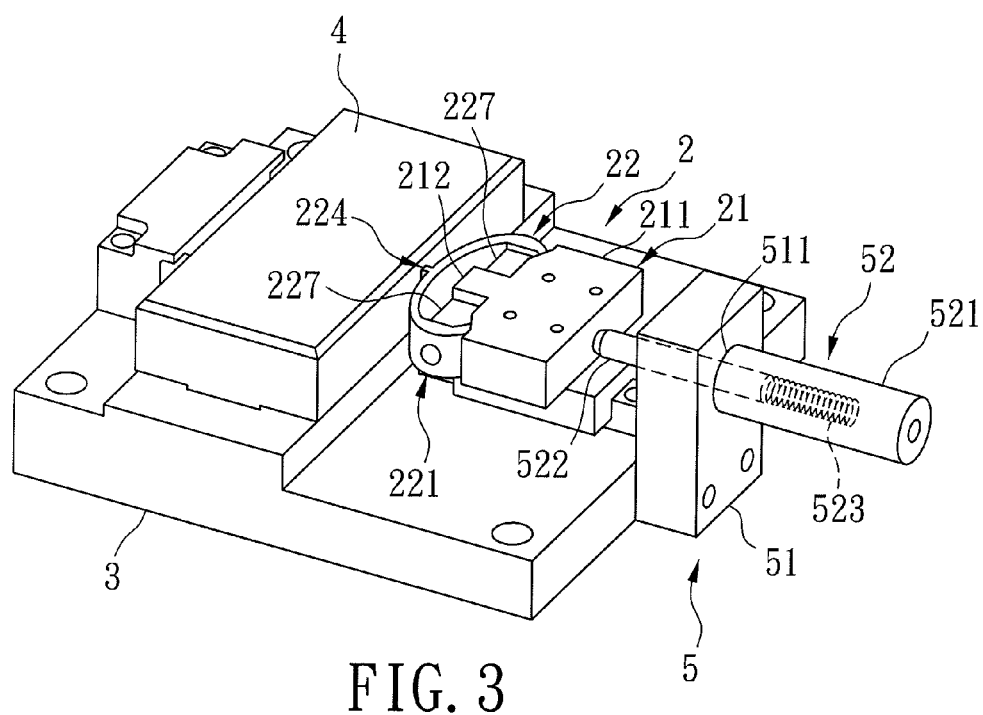
FIG. 3 is a perspective view of the first preferred embodiment of an ultrasonic motor according to this invention.

Referring to FIG. 3, the preferred embodiment of an ultrasonic motor according to this invention includes a base 3, a movable member 4 disposed movably on the base 3, a stator 2 disposed removably on the base 3, and a pushing unit 5.

Figure 4:
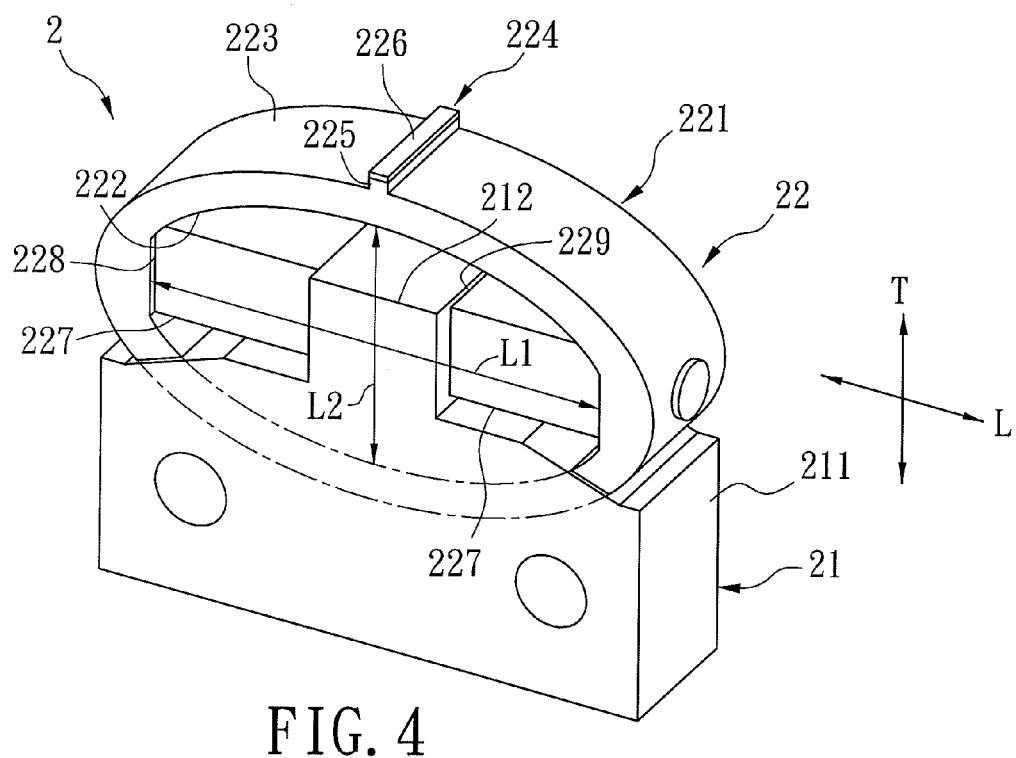
FIG. 4 is a perspective view of a stator of the first preferred embodiment.

With additional reference to FIG. 4, the stator 2 includes a seat 21 and a driving unit 22.

The seat 21 has a mounting portion 211 extending along a longitudinal direction (L), and a positioning portion 212 extending upwardly from a middle portion of the mounting portion 211 in a transverse direction (T) perpendicular to the longitudinal direction (L). As such, the seat 21 is generally inverted T-shaped.

The driving unit 22 includes a generally semi-elliptical driving mechanism 221 formed integrally with the seat 21 to constitute a unitary structure, and two spaced-apart piezoelectric actuators 227 disposed between the seat 21 and the driving mechanism 221.

The seat 21 and the driving mechanism 221 are made of an aluminum alloy or stainless steel. In this embodiment, the seat 21 and the driving mechanism 221 are made of an aluminum alloy.

The driving mechanism 221 has two ends connected integrally to the mounting portion 211, an interior surface 222, an exterior surface 223 opposite to and spaced apart from the interior surface 222, and a contact member 224 projecting from the exterior surface 223. The contact member 224 has a connecting portion 225 connected integrally to the exterior surface 223, and an anti-wear portion 226 disposed on the connecting portion 225. Of course, in practice, the contact member 224 may be omitted from the driving mechanism 221.

Figure 5:
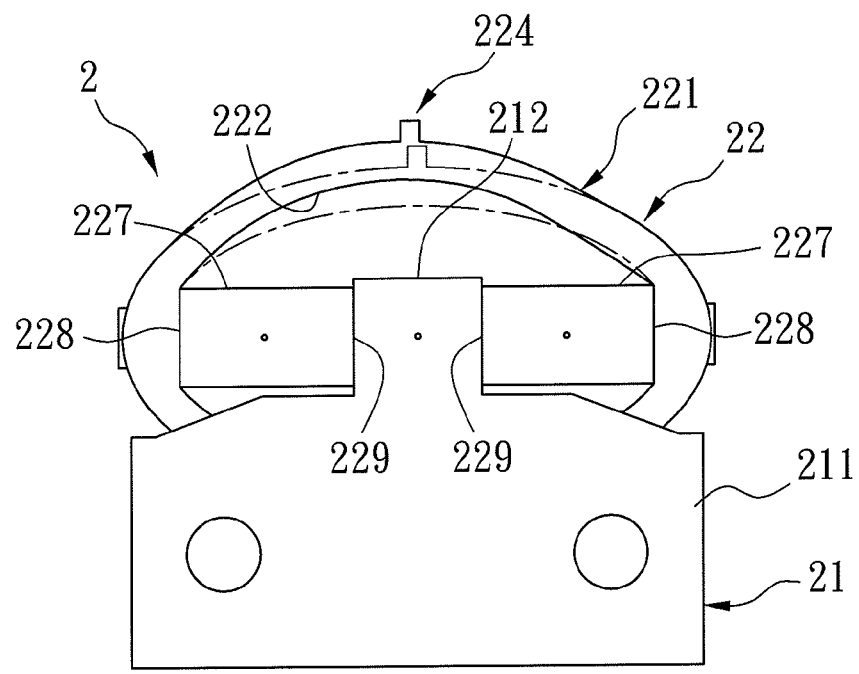
FIG. 5 is a schematic view illustrating a normal line direction vibration mode of the stator of the first preferred embodiment.

With further reference to FIG. 5, each of the piezoelectric actuators 227 has a first end 228 abutting against the interior surface 222 of the driving mechanism 221, and a second end 229 opposite to the first end 228 and abutting against the positioning portion 212 of the seat 21. The second ends 229 of the piezoelectric actuators 227 abut respectively against two opposite sides of the positioning portion 212.

Since the generally semi-elliptical driving mechanism 221 and the seat 21 are integrally formed with each other, the strength of the driving mechanism 221 of the stator 2 is enhanced to avoid deformation resulting from application of an external force and simplify the whole structure of the stator 2 to thereby reduce the assembly complexity and the assembly errors.

With particular reference to FIG. 3, in this embodiment, the movable member 4 is a platform movable relative to the stator 2.

The mounting portion 211 of the seat 21 of the stator 2 is disposed removably on the base 3. The positioning portion 212 projects from the mounting portion 211 toward the movable member 4. The contact member 224 is in contact with a side surface of the movable member 4.

The pushing unit 5 includes a fixed block 51 disposed removably on the base 3, and a resilient pushing mechanism 52 disposed on the fixed block 51. The resilient pushing mechanism 52 includes a hollow outer cylinder 521 extending fixedly through the fixed block 51, a push rod 522 disposed movably within the hollow outer cylinder 521, and a compression spring 523 disposed within the hollow outer cylinder 521 for biasing the push rod 522 to press against the mounting portion 211 of the seat 21. In this embodiment, the hollow outer cylinder 521 has an externally threaded portion (not shown) engaging a threaded hole 511 in the fixed block 51.

With inclusion of the stator 2 in the ultrasonic motor, the assembly complexity, errors, and costs of the ultrasonic motor can be reduced, and the movable member 4 can be moved accurately.

Figure 6:
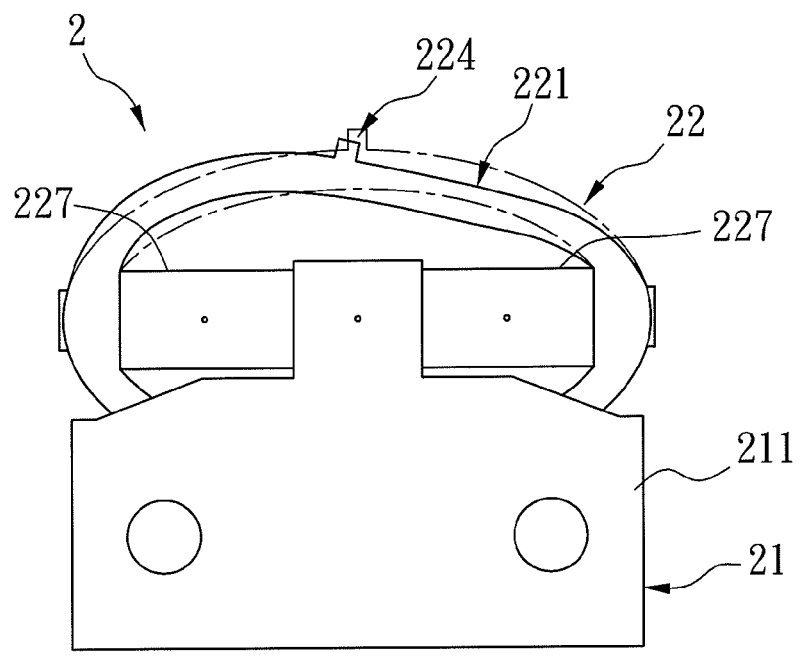
FIG. 6 is a schematic view illustrating a tangent line direction vibration mode of the stator of the first preferred embodiment.
Figure 7:
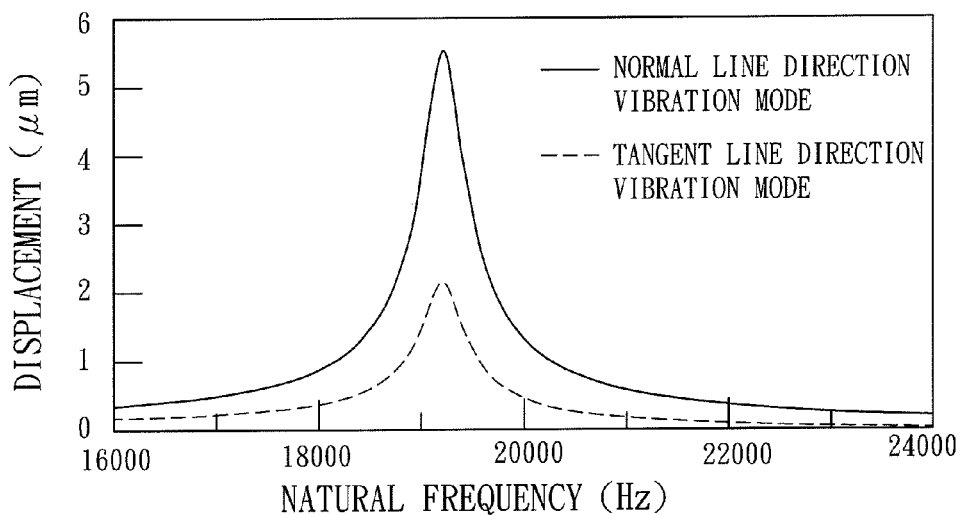
FIG. 7 is a diagram illustrating relationship between displacement of a working point of the stator and natural frequency.

When a driving voltage is applied to either of the two piezoelectric actuators 227, the driving mechanism 221 is deformed to move the movable member 4 relative to the seat 21 of the stator 2. The operation of the ultrasonic motor will be described in the following:

Referring to FIGS. 5, 6, and 7, the generally semi-elliptical driving mechanism 221 can be driven in a normal line direction vibration mode shown in FIG. 5 and a tangent line direction vibration mode shown in FIG. 6. When the driving mechanism 221 is not driven, it is shown by the phantom lines in FIGS. 5 and 6. Since the natural frequency of the normal line direction vibration is approximate to that of the tangent line direction vibration, as shown in FIG. 7, two driving voltages having the same frequency and different phases can be applied to the piezoelectric actuators 227, respectively, to drive movement of the contact member 224.

Figure 8:
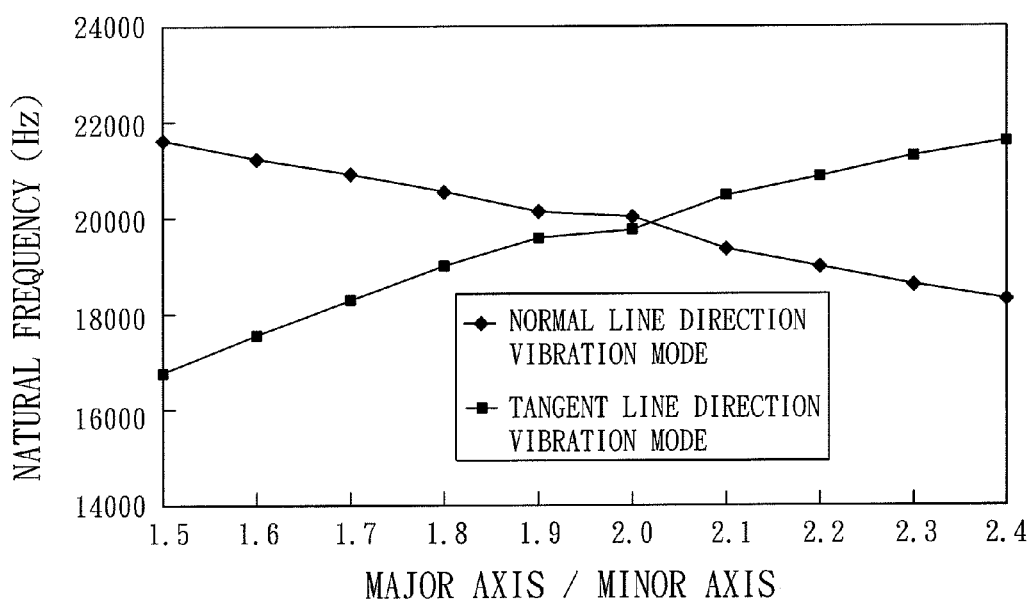
FIG. 8 is a curve view illustrating relationship between natural frequencies and a length ratio of a major axis to a minor axis of a generally semi-elliptical driving mechanism.

With particular reference to FIGS. 4 and 8, it is found from analysis of the applicants that, when the width and thickness of the driving mechanism 221 are fixed, the natural frequencies of the tangent line direction vibration and the normal line direction vibration are changed according to the length ratio of a major axis (L1) (see FIG. 4) to a minor axis (L2) (see FIG. 4) of the generally semi-elliptical driving mechanism 221, as shown in FIG. 8 in such a manner that, when the length ratio of the major axis (L1) to the minor axis (L2) increases, the natural frequency of the tangent line direction vibration also increases, and the natural frequency of the normal line direction vibration reduces, and when the length ratio is about 2.0, the natural frequencies of the tangent line direction vibration and the normal line direction vibration are approximate to each other.

To excite one period of the tangent line direction vibration and the normal line direction vibration of the driving mechanism 221, the tangent line direction vibration and the normal line direction vibration of the driving mechanism 221 need to have the same natural frequency. For this reason, the length ratio of the major axis (L1) to the minor axis (L2) is preferably between 1.9 and 2.1. In this embodiment, the length ratio of the major axis (L1) to the minor axis (L2) is 2.

Figure 9:
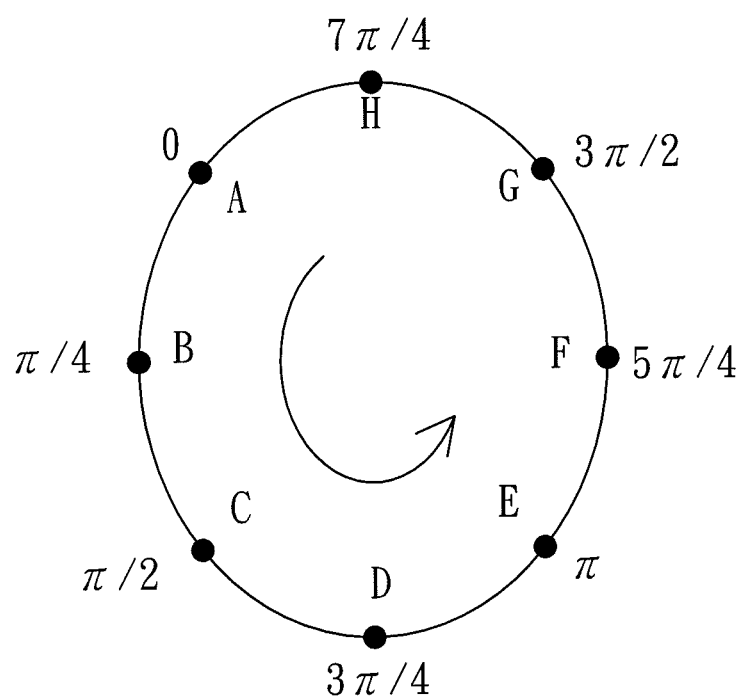
FIGS. 9 and 10 are schematic views illustrating deformation sequence of one period of vibration of the stator of the first preferred embodiment when two-phase high frequency driving voltages are applied.
Figure 10:
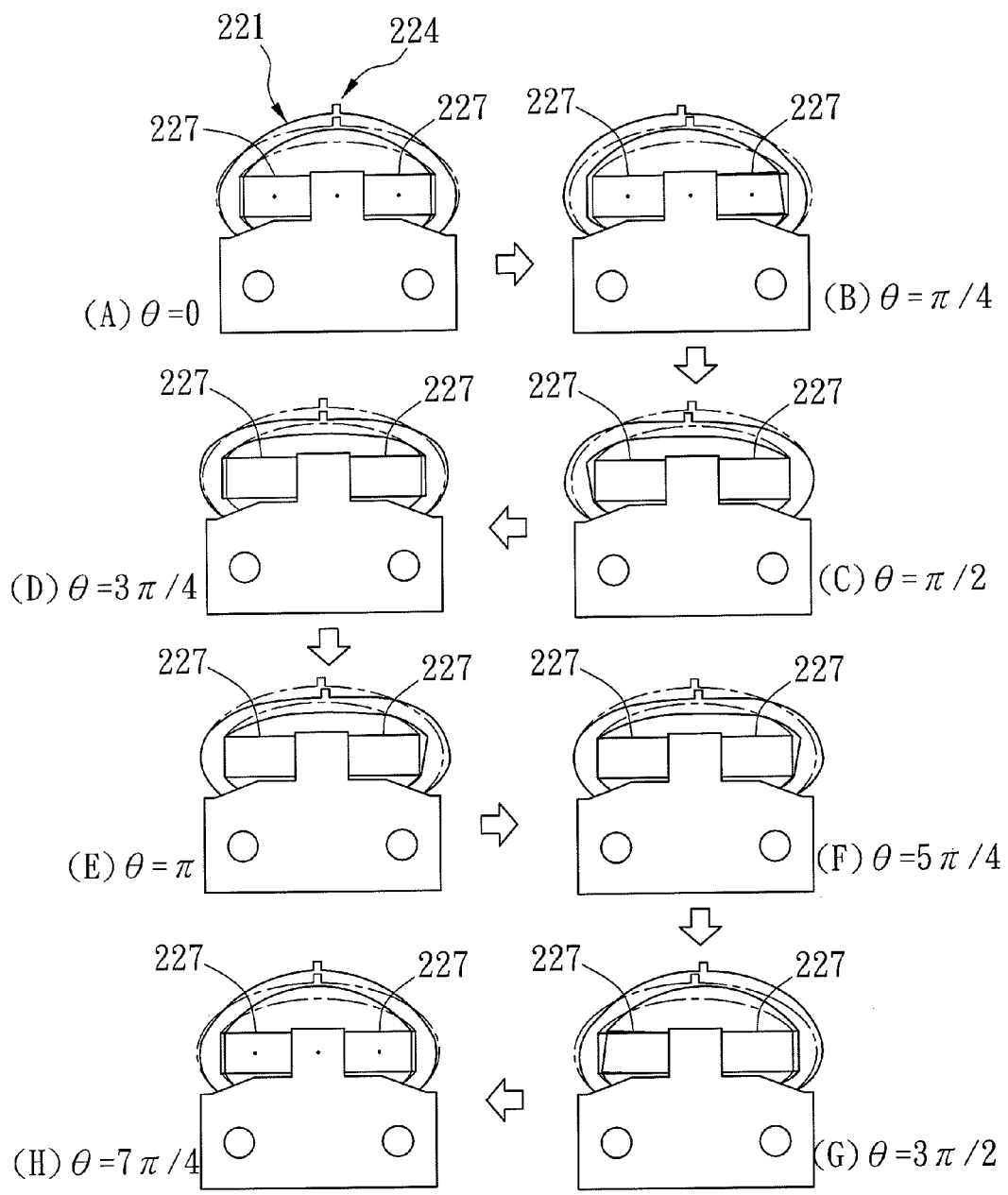

Referring to FIGS. 9 and 10, when two sine wave driving voltages having the same frequency and a phase difference of 90° are applied respectively to the piezoelectric actuators 227, as shown in FIG. 9, the contact member 224 of the driving mechanism 221 is vibrated in an elliptical motion shown in FIG. 10. For convenience of comparing the driving voltages and the elliptical vibration of the contact member 224 of the driving mechanism 221, the voltage waveform of FIG. 9 is divided into time points of (A, B, C, D, E, F, G, H).

The phantom lines in FIG. 10 show the start position of the driving mechanism 221 when driving voltages are not applied to the piezoelectric actuators 227.

Figure 11:
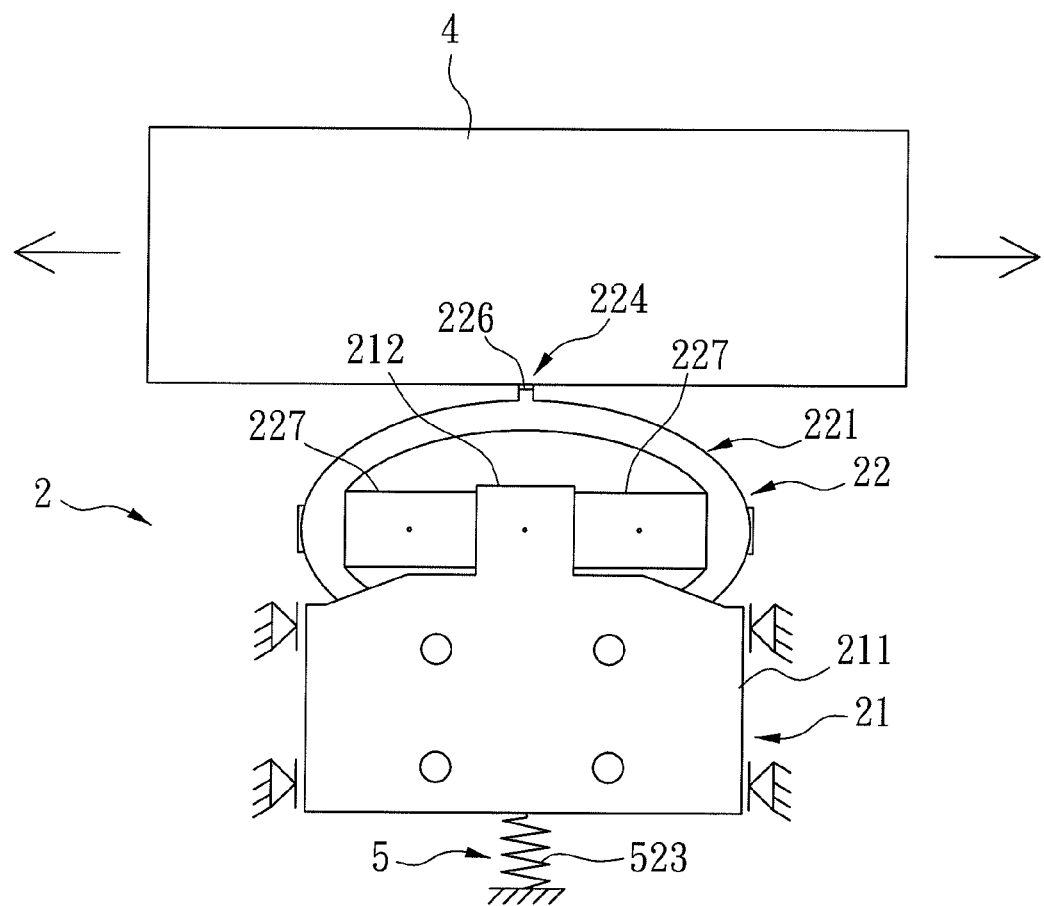
FIG. 11 is a schematic view illustrating how a movable member is moved by the stator of the first preferred embodiment.

At the point (A), as shown in FIG. 10 (A), the right piezoelectric actuator 227 is applied with a voltage of −10 volts, and thus is contracted, and the left piezoelectric actuator 227 is not deformed due to lack of application of any driving voltage thereto, so that the contact member 224 is moved leftwardly and upwardly. At the point (B), as shown in FIG. 10 (B), the right piezoelectric actuator 227 is applied with a voltage of $-5\sqrt{2}$ volts, and thus is contracted, and the left piezoelectric actuator 227 is applied with a voltage of $+5\sqrt{2}$ volts, and thus is extended, so that the contact member 224 is moved leftwardly. At the point (C), as shown in FIG. 10 (C), the right piezoelectric actuator 227 is not deformed due to lack of application of any driving voltage thereto, and the left piezoelectric actuator 227 is applied with a voltage of +10 volts, and thus is extended, so that the contact member 224 is moved leftwardly and downwardly. At the point (D), as shown in FIG. 10 (D), each of the right piezoelectric actuator 227 and the left piezoelectric actuator 227 is applied with a voltage of $+5\sqrt{2}$ volts, and thus is extended, so that the contact member 224 is moved downwardly. At the point (E), as shown in FIG. 10 (E), the right piezoelectric actuator 227 is applied with a voltage of +10 volts, and thus is extended, and the left piezoelectric actuator 227 is not deformed due to lack of application of any driving voltage thereto, so that the contact member 224 is moved rightwardly and downwardly. At the point (F), as shown in FIG. 10 (F), the right piezoelectric actuator 227 is applied with a voltage of $+5\sqrt{2}$ volts, and thus is extended, and the left piezoelectric actuator 227 is applied with a voltage of $-5\sqrt{2}$ volts, and thus is, contracted so that the contact member 224 is moved rightwardly. At the point (G), as shown in FIG. 10 (G), the right piezoelectric actuator 227 is not deformed due to lack of application of any driving voltage thereto, and the left piezoelectric actuator 227 is applied with a voltage of −10 volts, and thus is contracted, so that the contact member 224 is moved rightwardly and upwardly. At the point (H), as shown in FIG. 10 (H), each of the right piezoelectric actuator 227 and the left piezoelectric actuator 227 is applied with a voltage of $-5\sqrt{2}$ volts, and thus is contracted, so that the contact member 224 is moved upwardly. Through a periodic change of the time points of (A, B, C, D, E, F, G, H), the elliptical motion of the contact member 224 is finished. It should be noted that, in FIGS. 9 and 10, the phase of the driving voltage applied to the left piezoelectric actuator 227 leads that applied to the right piezoelectric actuator 227 by a phase difference of 90°, such that the elliptical vibration of the contact member 224 is performed in a counterclockwise direction. Alternatively, the phase of the driving voltage applied to the right piezoelectric actuator 227 may lead that applied to the left piezoelectric actuator 227 by a phase difference of 90°. If this occurs, the elliptical vibration of the contact member 224 will be performed in a clockwise direction. Consequently, the phase difference of the driving voltages applied respectively to the two piezoelectric actuators 227 can be changed to adjust the lengths of the major axis and minor axis of the elliptical path of the contact member 224. With particular reference to FIG. 11, when the contact member 224 is vibrated in the elliptical motion, since the contact member 224 of the driving mechanism 221 is biased by the compression spring 523 to press against the movable member 4, the movable member 4 is driven by the contact member 224 to perform a reciprocal linear movement. A distance traveled by the movable member 4 can be changed by adjusting the elliptical path of the contact member 224.

In additional to the manner illustrated by FIG. 10, the contact member 224 can also be vibrated in an elliptical motion by applying a single-phase high frequency driving voltage to only one of the piezoelectric actuators 227.

Figure 12:
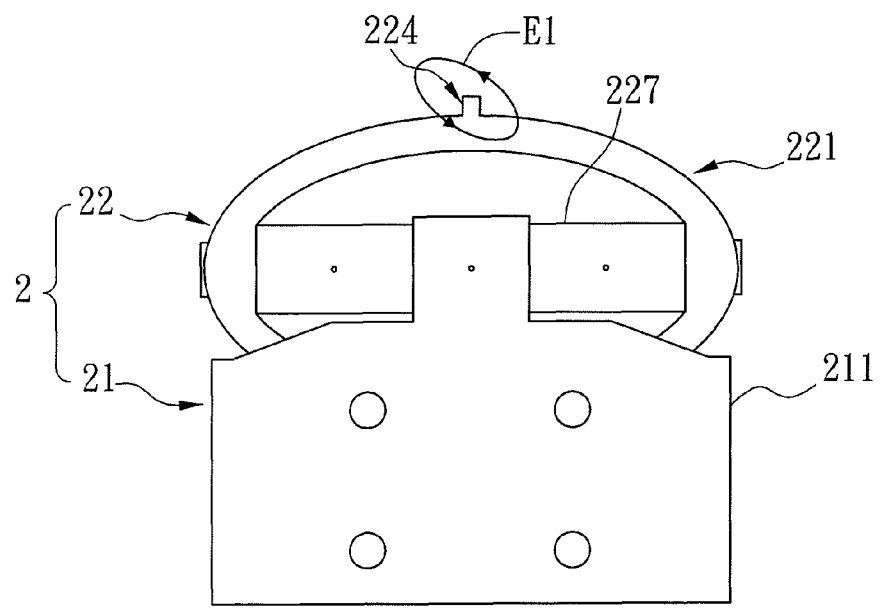
FIG. 12 illustrating a vibrational motion of a contact member caused when one of two piezoelectric actuators of the stator of the first preferred embodiment is applied with a single-phase high frequency driving voltage.
Figure 13:
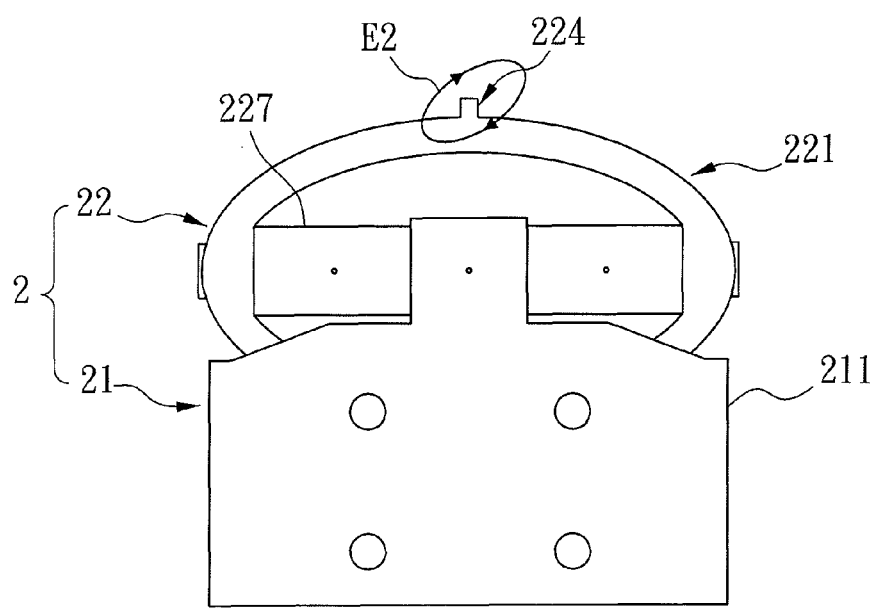
FIG. 13 illustrating a vibrational motion of the contact member caused when the other one of two piezoelectric actuators of the stator of the first preferred embodiment is applied with a single-phase high frequency driving voltage.

For example, as shown in FIG. 12, application of a sine wave driving voltage to the right piezoelectric actuator 227 results in periodic extension and contraction of the right piezoelectric actuator 227 along an elliptical path (E1), and as shown in FIG. 13, application of a sine wave driving voltage to the left piezoelectric actuator 227 results in periodic extension and contraction of the left piezoelectric actuator 227 along an elliptical path (E2).

Upon application of high frequency driving voltages in the manners illustrated in FIGS. 10, 12, and 13, the movable member 4 can be moved at a high speed. When a high accuracy movement of the movable member 4 is required, it is necessary to apply low frequency driving voltages to the piezoelectric actuators 227, as shown in FIGS. 14 and 15.

Figure 14:
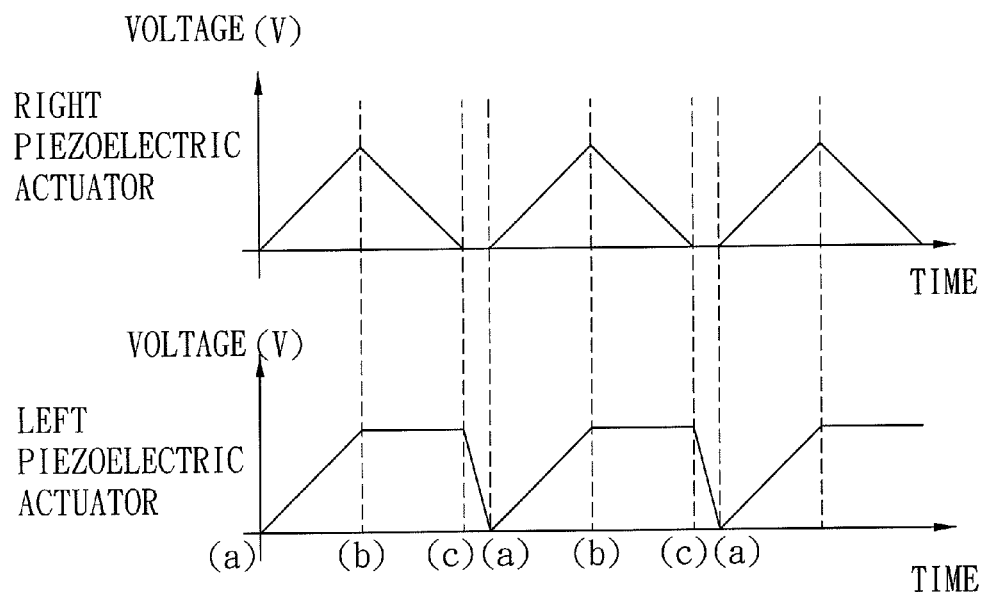
FIG. 14 is a diagram illustrating that the two piezoelectric actuators are applied with low frequency driving voltages.
Figure 15:
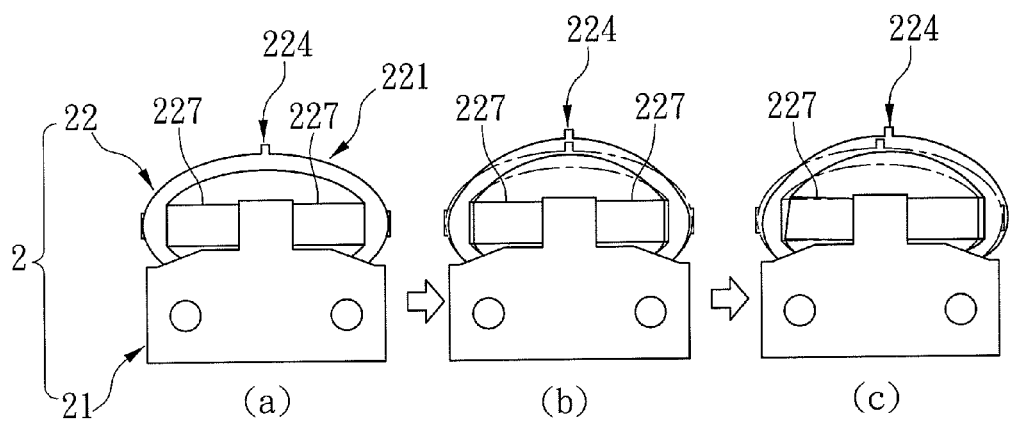
FIG. 15 is a schematic view illustrating deformation sequence of vibration of the stator of the first preferred embodiment when the low frequency driving voltages are applied.

Referring to FIGS. 14 and 15, when low frequency driving voltages are applied respectively to the piezoelectric actuators 227, the contact member 224 of the driving mechanism 224 is vibrated as shown in FIG. 15. At a point (a) of FIG. 14, as shown in FIG. 15(*a*), no driving voltage is applied to the piezoelectric actuators 227, so that the contact member 224 is not deformed. At a point (b) of FIG. 14, as shown in FIG. 15(*b*), the piezoelectric actuators 227 are applied with the same negative driving voltages, and thus are contracted by the same amount, so that the contact member 224 of the driving mechanism 221 is moved away from the piezoelectric actuators 227. At a point (c) of FIG. 14, as shown in FIG. 15(*c*), the left piezoelectric actuator 227 is applied with the negative driving voltage, and no driving voltage is applied to the right piezoelectric actuator 227, so that the contact member 224 is moved rightwardly to push and move the movable member 4 by a small distance. In this manner, similar to an inchworm motor, the movable member 4 can be moved accurately at a low speed.

Figure 16:
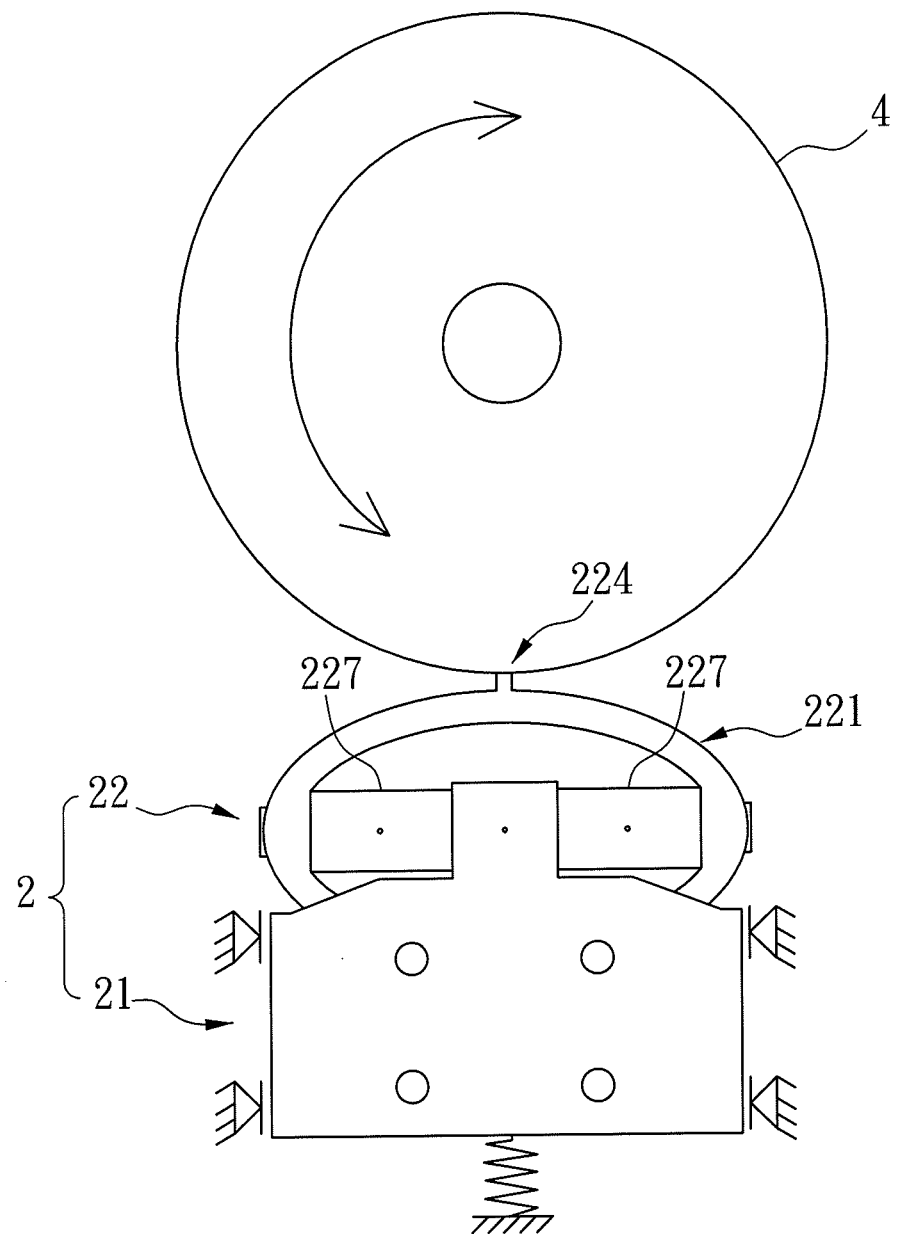
FIG. 16 is a schematic view of the second preferred embodiment of an ultrasonic motor according to this invention.

FIG. 16 shows the second preferred embodiment of an ultrasonic motor according to this invention, which differs from the first preferred embodiment in that the movable member 4 is configured as a rotor that is rotatable relative to the stator 2.

Figure 17:
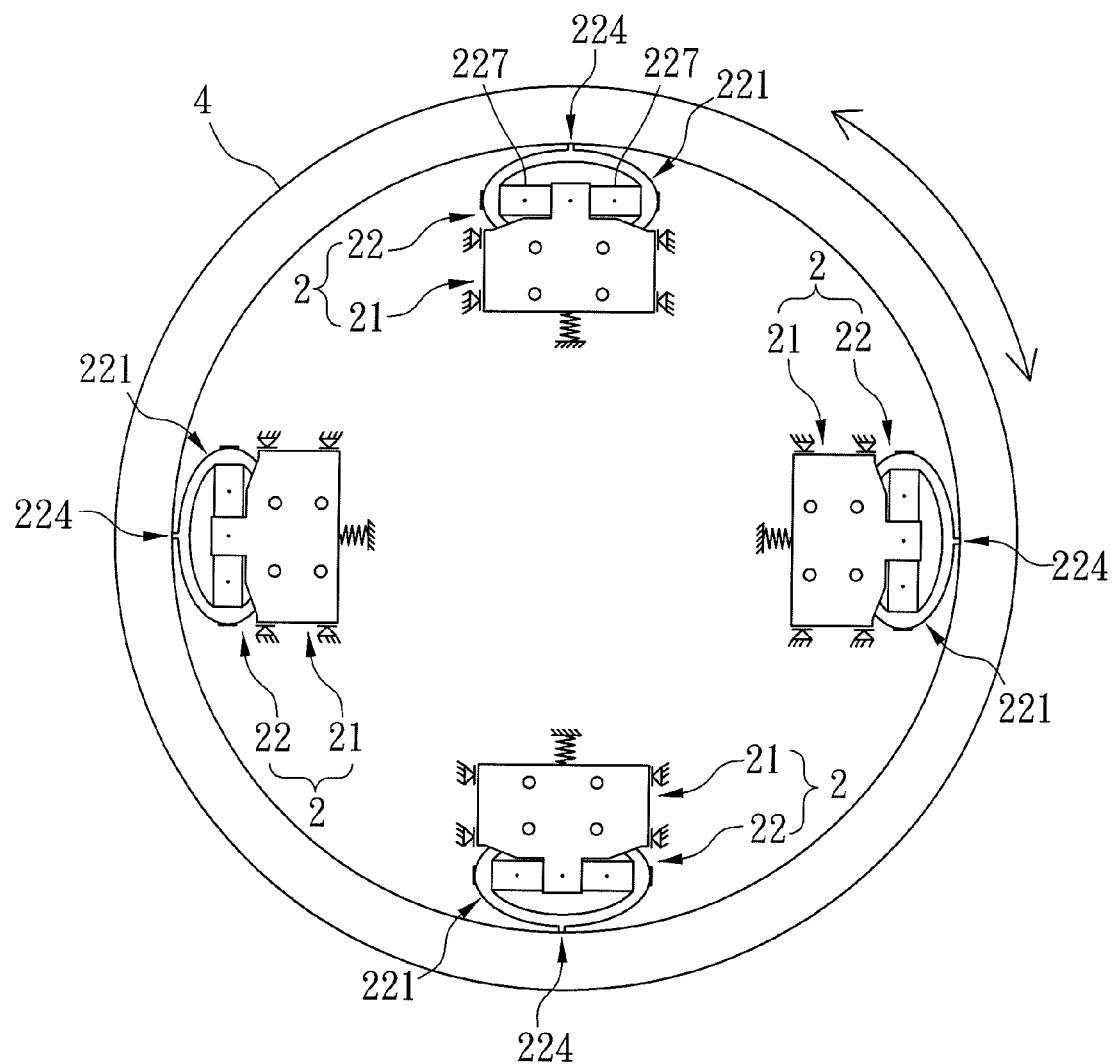
FIG. 17 is a schematic view of the third preferred embodiment of an ultrasonic motor according to this invention.

FIG. 17 shows the third preferred embodiment of an ultrasonic motor according to this invention, which is similar in construction to the first preferred embodiment. Unlike the first preferred embodiment, the ultrasonic motor includes four angularly equidistant stators 2, and the movable member 4 is configured as a ring disposed around and rotatable relative to the stators 2.

In view of the above, since an assembly of the generally semi-elliptical driving mechanism 221 and the seat 21 is designed as a one-piece structure, the strength of the driving mechanism 221 is enhanced to avoid deformation resulting from application of an external force and simplify the structure of the stator 2 to thereby reduce the assembly complexity, errors, and costs of the ultrasonic motor and promote the motion accuracy of the movable member 4. Thus, the objects of this invention are achieved.

With this invention thus explained, it is apparent that numerous modifications and variations can be made without departing from the scope and spirit of this invention. It is therefore intended that this invention be limited only as indicated by the appended claims.

We claim:
1. A stator adapted to be used in an ultrasonic motor, said stator comprising:

a seat having a mounting portion extending along a longitudinal direction, and a positioning portion extending outwardly from a middle portion of said mounting portion in a traverse direction perpendicular to the longitudinal direction; and a driving unit including a generally semi-elliptical driving mechanism formed integrally with said seat, and two spaced-apart piezoelectric actuators disposed between said seat and said driving mechanism, each of said piezoelectric actuators having a first end abutting against said driving mechanism, and a second end opposite to said first end and abutting against said seat, said driving mechanism having two ends connected integrally to said mounting portion, said second ends of said piezoelectric actuators abutting respectively against two opposite sides of said positioning portion of said seat.

2. The stator as claimed in claim 1, wherein said driving mechanism has an interior surface, an exterior surface opposite to and spaced apart from said interior surface, and a contact member projecting from said exterior surface, said first ends of said piezoelectric actuators abutting against said interior surface of said driving mechanism.

3. The stator as claimed in claim 2, wherein said contact member of said driving mechanism has a connecting portion connected integrally to said exterior surface of said driving mechanism, and an anti-wear portion disposed on said connecting portion.

4. The stator as claimed in claim 1, wherein a ratio of a length of a major axis to that of a minor axis of said generally semi-elliptical driving mechanism is between 1.9 and 2.1.

5. An ultrasonic motor comprising:
a base;
a movable member disposed movably on said base;
at least one stator including a seat disposed removably on said base, and a driving unit including a generally semi-elliptical driving mechanism formed integrally with seat, and two spaced-apart piezoelectric actuators disposed between said seat and said driving mechanism, each of said piezoelectric actuators having a first end abutting against said driving mechanism, and a second end opposite to said first end and abutting against said seat; and a pushing unit for biasing said driving mechanism to press against said movable member;

wherein, when a driving voltage is applied to either of said piezoelectric actuators to deform said driving mechanism, said movable member is driven by said driving mechanism to move relative to said seat.

6. The ultrasonic motor as claimed in claim 5, wherein said seat has a mounting portion extending along a longitudinal direction, and a positioning portion extending outwardly from a middle portion of said mounting portion in a traverse direction perpendicular to the longitudinal direction, said driving mechanism having two ends connected integrally to said mounting portion, an interior surface, an exterior surface opposite to and spaced apart from said interior surface, and a contact member projecting from said exterior surface, said first ends of said piezoelectric actuators abutting against said interior surface of said driving mechanism, said second ends of said piezoelectric actuators abutting respectively against two opposite sides of said positioning portion of said seat.

7. The ultrasonic motor as claimed in claim 6, wherein a ratio of a length of a major axis to that of a minor axis of said generally semi-elliptical driving mechanism is between 1.9 and 2.1, said contact member of said driving mechanism having a connecting portion connected integrally to said exterior surface of said driving mechanism, and an anti-wear portion disposed on said connecting portion.

8. The ultrasonic motor as claimed in claim 6, wherein said pushing unit includes:
a fixed block disposed removably on said base; and
a resilient pushing mechanism including a hollow outer cylinder extending fixedly through said fixed block, a push rod disposed movably within said hollow outer cylinder, and a compression spring disposed within said hollow outer cylinder for biasing said push rod to press against said mounting portion of said seat.

9. The ultrasonic motor as claimed in claim 5, wherein said ultrasonic motor comprises a plurality of said stators.

* * * * *